ип
US010048692B2

(12) United States Patent
Hamada et al.

(10) Patent No.: US 10,048,692 B2
(45) Date of Patent: Aug. 14, 2018

(54) VEHICLE TRAVEL SYSTEM

(71) Applicant: HITACHI CONSTRUCTION MACHINERY CO., LTD., Tokyo (JP)

(72) Inventors: Tomoyuki Hamada, Tsuchiura (JP); Kazuhiro Sugawara, Tsuchiura (JP); Katsuaki Tanaka, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 109 days.

(21) Appl. No.: 14/917,411

(22) PCT Filed: Dec. 12, 2013

(86) PCT No.: PCT/JP2013/083358
§ 371 (c)(1),
(2) Date: Mar. 8, 2016

(87) PCT Pub. No.: WO2015/087430
PCT Pub. Date: Jun. 18, 2015

(65) Prior Publication Data
US 2016/0224026 A1 Aug. 4, 2016

(51) Int. Cl.
G05D 1/02 (2006.01)
G05D 1/00 (2006.01)
(Continued)

(52) U.S. Cl.
CPC ......... *G05D 1/0212* (2013.01); *E02F 9/2004* (2013.01); *E02F 9/205* (2013.01);
(Continued)

(58) Field of Classification Search
CPC ..... G05D 1/00; G05D 1/02; B60P 1/30; E02F 9/20; E02F 9/26
See application file for complete search history.

(56) References Cited

U.S. PATENT DOCUMENTS 7,425,889 B2 * 9/2008 Widmann ............... B60R 1/003
340/425.5
9,725,048 B2 * 8/2017 Heinemann ............. B60R 11/04
(Continued)

FOREIGN PATENT DOCUMENTS

JP 01-296318 A 11/1989
JP 05-265554 A 10/1993
(Continued)

OTHER PUBLICATIONS

International Search Report of PCT/JP2013/083358 dated Jan. 14, 2014.

*Primary Examiner* — Yonel Beaulieu
*Assistant Examiner* — Martin A Weeks
(74) *Attorney, Agent, or Firm* — Mattingly & Malur, PC

(57) ABSTRACT

Disclosed are a vehicle travel system and vehicle travel control method for guiding a haulage vehicle to a loading point without interference with obstacles. The vehicle travel system is provided with a direction input device (102), travel route calculating unit (1507) and vehicle control unit (205). Through the direction input device, an operator of a loading machine (10) inputs the direction of a body of a haulage vehicle (20-1) at a loading point (LP-L or LP-R). The travel route calculating unit calculates a travel route on which the haulage vehicle (20-1) is to be stopped in the inputted direction at the loading point (LP-L or LP-R). The vehicle control unit performs vehicle control to allow the haulage vehicle (20-1) to travel along and stop on the travel route.

4 Claims, 13 Drawing Sheets

(51) Int. Cl.
*E02F 9/26* (2006.01)
*E02F 9/20* (2006.01)

(52) U.S. Cl.
CPC .............. *E02F 9/2054* (2013.01); *E02F 9/26* (2013.01); *G05D 1/0011* (2013.01); *G05D 1/0027* (2013.01); *G05D 1/0044* (2013.01); *G05D 2201/0202* (2013.01)

(56) References Cited

U.S. PATENT DOCUMENTS

| | | | |
|---|---|---|---|
| 2013/0325208 A1* | 12/2013 | Osagawa | E02F 9/205 701/2 |
| 2014/0231153 A1* | 8/2014 | Fukasu | E02F 9/26 177/25.13 |

FOREIGN PATENT DOCUMENTS

| | | |
|---|---|---|
| JP | 9-104397 A | 4/1997 |
| JP | 2012-022611 A | 2/2012 |
| WO | 2013/058247 A1 | 4/2013 |
| WO | 2013/065312 A1 | 5/2013 |

* cited by examiner

VEHICLE TRAVEL SYSTEM

TECHNICAL FIELD

The present invention relates to a vehicle travel system and vehicle travel control method, and especially to a technology for setting the direction of a haulage vehicle at a loading point.

BACKGROUND ART

Upon loading excavated rock on a haulage vehicle such as a dump truck by a loading machine such as an excavator in an open-pit mine or the like, an operator of the loading machine needs to inform a loading point to the haulage vehicle and to have the haulage vehicle come to that point. If the haulage vehicle is a manned vehicle, the indication of a point by raising a bucket of the loading machine or in a like manner makes it possible to move the haulage vehicle to an appropriate point with the haulage vehicle directed properly by judgments of an operator of the haulage vehicle. If the haulage vehicle is operated unmanned, in other words, is an unmanned vehicle, such judgments of the operator of the haulage vehicle cannot be relied upon, and therefore, there is a problem that the operator of the loading machine needs to appropriately set a point, to which the haulage vehicle is to come, and a direction of the haulage vehicle at the point and to inform them to the unmanned haulage vehicle.

As a technology for resolving the above-mentioned problem, the technology described in Patent Document 1 is known, for example. Patent Document 1 discloses a configuration, in which the operator of a loading machine sets a loading point and a control system for controlling travel of an unmanned haulage vehicle calculates a route to the loading point based on information such as the position of the loading machine, the loading point and the boundary of a working front and transmits the route to the unmanned haulage vehicle. According to this configuration, the unmanned haulage vehicle can travel along the route obtained from the control system, and can stop at the loading point.

PRIOR ART DOCUMENT

Patent Document

Patent Document 1: JP-A-2012-22611

DISCLOSURE OF THE INVENTION

Problem to be Solved by the Invention

According to the technology described in Patent Document 1, the route is generated based on information that the control system can grasp, such as the position of the loading machine, the loading point and the boundary of the working face. However, rock scatters around the working face upon excavation. The state of scattering of rock varies as the excavation work proceeds, but such variations are not reflected to map information and cannot hence be grasped by the control system. If the unmanned haulage vehicle travels along a route generated solely from information that the control system can grasp, such as the position of the loading machine, the loading point and the boundary of the working face, the problem that an obstacle such as scattered rock and the unmanned haulage vehicle may interfere with each other still remains unsolved.

With such a problem in view, the present invention has as an object thereof the provision of a vehicle travel system and vehicle travel control method for guiding an unmanned haulage vehicle to a loading point without interference with a loading machine or an obstacle such as rock scattered around a travel route.

Means for Solving the Problem

To achieve the above-described object, the present invention is characterized in that in a vehicle travel system for guiding a haulage vehicle, which hauls a payload by unmanned operation from a loading machine that performs loading work of the payload, to a loading point for the payload, the vehicle travel system comprises a direction input device through which an operator of the loading machine inputs a direction of a body of the haulage vehicle at the loading point, a travel route calculation unit that calculates a travel route to stop the haulage vehicle in the inputted direction at the loading point, and a vehicle control unit that performs vehicle control to allow the haulage vehicle to travel along and stop on the travel route.

According to this invention, the operator of the loading machine inputs the direction of the body of the haulage vehicle at the loading point so as to avoid an interference with an obstacle which the operator himself or herself has grasped, and a travel route is calculated such that the haulage vehicle can stop at the loading point with the body being directed as inputted. By performing vehicle control such that the haulage vehicle is allowed to travel along and stop on the travel route, the haulage vehicle can be guided to the loading point without interference from the obstacle.

More specifically, as illustrated, for example, in FIG. 8, with the direction of a body of a dump truck as indicated by reference numeral 540a, scattered rock 550 and the dump truck interfere with each other. If the direction of the body of the dump truck is then turned about a loading point (which is equivalent to a bucket position 520) as indicated by reference numeral 540b, the interference with the rock 550 is eliminated. By changing the direction of the body of the dump truck as described above, the dump truck can be guided without interference with the surrounding obstacle even if the loading point is the same. By changing the direction of the body of the dump truck, the dump truck is, therefore, allowed to stop with avoidance of possible interference without conducting resetting of the dumping point so set.

The present invention may also be characterized in that in the configuration described above, the vehicle travel system further comprises a display device that displays a setting screen including a haulage vehicle image, said haulage vehicle image indicating the direction of the body of the haulage vehicle at the loading point, and a screen display control unit that performs display control of the setting screen; the direction input device receives an input of an angle of turning movement to change the direction of the haulage vehicle image; and the screen display control unit makes, in the setting screen, the haulage vehicle image turn and move in accordance with the angle of turning movement about a two-dimensional loading point that indicates the loading point.

According to this invention, the turning of the haulage vehicle image on the setting screen in accordance with the angle of turning movement inputted by the operator from the input device can facilitate the visual grasping of the direction of the body of the haulage vehicle, and therefore can provide improved operability upon input operation of a direction.

The present invention may also be characterized in that in the configuration described above, the screen display control unit displays the travel route in superimposition on the setting screen.

According to this invention, the operator can perform the input operation of a direction of the haulage vehicle at the loading point while also taking the travel route into consideration.

The present invention may also be characterized in that in the configuration described above, the vehicle travel system further comprises a warning unit that, with reference to positional information on an obstacle located around the loading point or the travel route, produces a warning if an interference with the obstacle is expected when the haulage vehicle travels along the travel route displayed in superimposition on the setting screen or if an interference with the obstacle is expected when the haulage vehicle stops at the loading point and along the direction of the haulage vehicle image displayed in superimposition on the setting screen.

According to this invention, if an interference with an obstacle is expected during traveling along the travel route or upon stopping at the loading point, the production of a warning can urge the operator to input the direction of the haulage vehicle again such that the interference can be avoided.

The present invention may also be characterized in that in the configuration described above, the vehicle travel system further comprises a monitoring image generation unit that changes a view point of a camera image, which has been obtained by shooting a periphery of the loading machine, to an upper viewpoint to synthesize a monitoring image; and the screen display control unit synthesizes a wide area image including a queuing position for the haulage vehicle and the loading point, synthesizes a composite image with the monitoring image superimposed on a partial area, which corresponds to a shooting range of the monitoring image, in the wide area image, and displays the travel route in superimposition on the composite image.

According to this invention, the state of the periphery of the loading machine is shown in the monitoring image so that the operator can perform the input operation of the direction of the haulage vehicle while confirming the position of any obstacle around the loading machine as shown in the monitoring image. In addition, the queuing position, which is located outside the shooting area of the monitoring image, and the travel route from the queuing position to the loading point are displayed on the setting screen, and therefore the operator can perform the input operation of the direction of the haulage vehicle while confirming possible interference with the obstacle with respect to the travel route that varies as the direction of the body changes.

The present invention may also be characterized in that in the configuration described above, the loading machine includes a front working device for performing the loading work and control levers for operating the front working device, and the direction input device is configured including a ring member that is provided on one of the control levers and is turnable about a direction of an axis of the one of the control levers.

The operator seldom releases the hands from the control levers during continuance of the loading work. According to this invention, while maintaining the control levers held by the hands, the operator can perform the input operation of the direction of the haulage vehicle by turning the ring member with the thumb or the like. As the input operation of the direction of the haulage vehicle can hence be performed while continuing the loading work, an improvement can be expected in the productivity of loading work.

The present invention is also characterized in that in a vehicle travel control method for guiding a haulage vehicle, which hauls a payload by unmanned operation from a loading machine that performs loading work of the payload, to a loading point for the payload, the vehicle travel control method comprises a step of receiving, from an operator of the loading machine, an input operation of a direction of a body of the haulage vehicle at the loading point; a step of calculating a travel route for making the haulage vehicle stop in the inputted direction at the loading point); and a step of performing vehicle control to allow the haulage vehicle to travel along and stop on the travel route.

According to this invention, the operator of the loading machine inputs the direction of the body of the haulage vehicle at the loading point so as to avoid an interference with an obstacle which the operator himself or herself has grasped, and a travel route is calculated such that the haulage vehicle can stop at the loading point with the body being directed as inputted. By performing vehicle control such that the haulage vehicle is allowed to travel along and stop on the travel route, the haulage vehicle can be guided to the loading point without interference with the obstacle.

Advantageous Effects of the Invention

According to the present invention, it is possible to provide a vehicle travel system and vehicle travel control method that guide an unmanned haulage vehicle to a loading point without interference with an obstacle such as rock scattered around a loading machine or a travel route.

MODES FOR CARRYING OUT THE INVENTION

Figure 1:
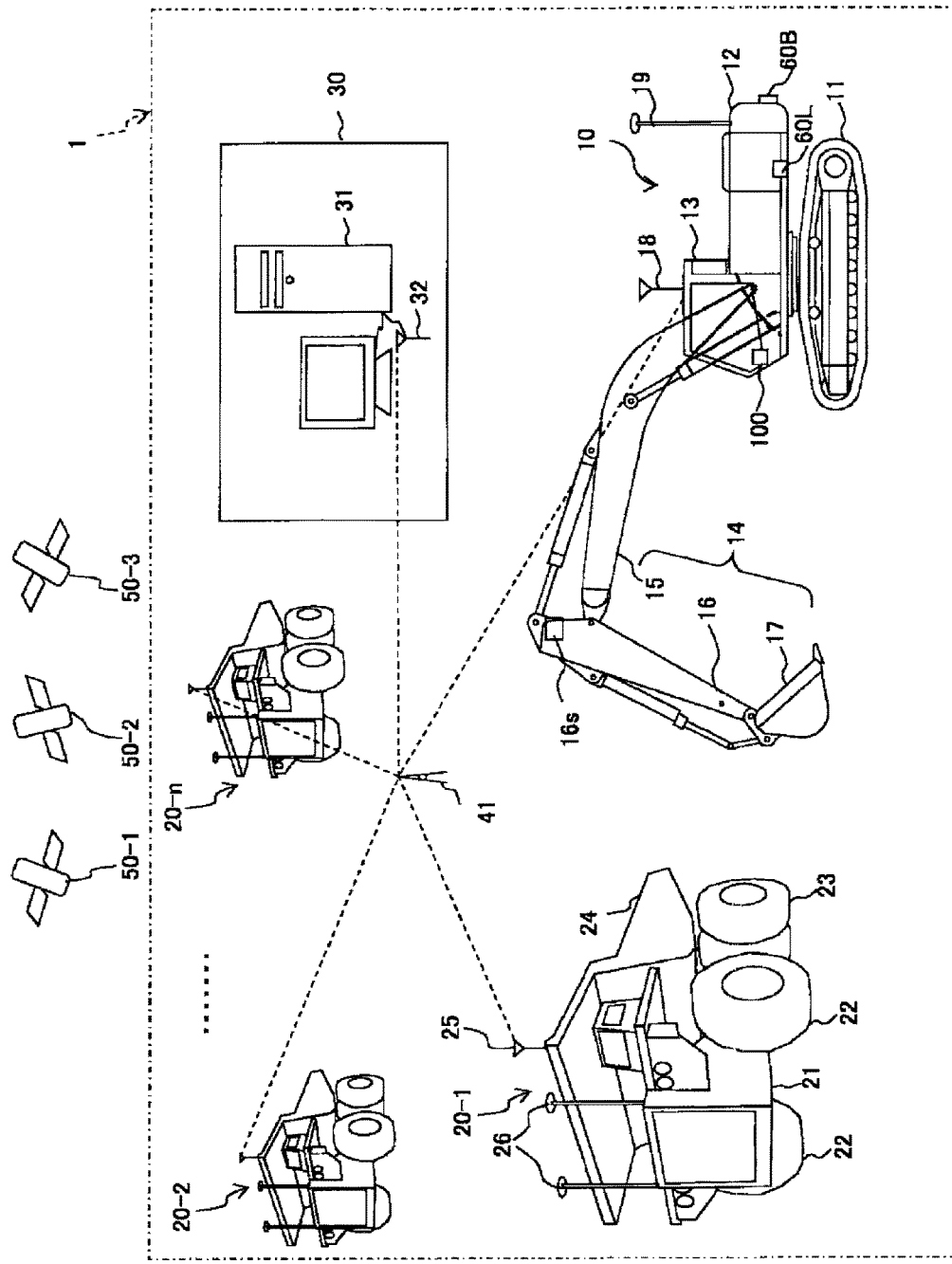
FIG. 1 is a view showing the schematic configuration of a vehicle travel system 1 according to an embodiment.

With reference to the drawings, a description will hereinafter be made about the embodiment of the present invention. Throughout all the figures, like elements are identified by like reference numerals, and their overlapping description is omitted.

Based on FIG. 1, a description will first be made about the schematic configuration of the vehicle travel system according to this embodiment. FIG. 1 is a view showing the schematic configuration of the vehicle travel system 1 according to this embodiment.

The vehicle travel system 1 shown in FIG. 1 includes the excavator 10, one or more unmanned haulage vehicles (hereinafter called "dump trucks") 20-1, 20-2, ..., 20-n, and the control unit 31. In a quarry such as a mine, the excavator 10 serves as a loading machine that performs loading work of rock and ore, and the one or more dump trucks 20-1, 20-2, ..., 20-n haul rock and ore by unmanned operation. The control unit 31 is installed at a control center 30 that is near or remote from the quarry. The excavator 10, respective dump trucks 20-1, 20-2, ..., 20-n and control unit 31 are mutually connected for communications via wireless communication lines. It is to be noted that in FIG. 1, reference numeral 41 designates a wireless communication relay station. The loading machine may be a wheel loader instead of the excavator.

The excavator 10 and the respective dump trucks 20-1, 20-2, ..., 20-n are each provided with an own vehicle position detecting unit, the illustration of which is omitted in FIG. 1, for detecting the position (three-dimensional real coordinates) of the own vehicle by receiving positioning radio waves from at least three navigation satellites 50-1, 50-2, 50-3 in a global navigation system (GNSS). As GNSS, GPS (Global Positioning System), GLONASS (Global Navigation Satellite System) or GALILEO may be employed.

The excavator 10 is a super jumbo hydraulic excavator, and is constructed of an undercarriage 11, an upperstructure 12 and cab 13 turnably mounted on the undercarriage 11, and a front working device 14 centrally disposed on a front part of the upperstructure 12. The front working device 14 includes a boom 15 pivotally arranged in an up-and-down direction relative to the upperstructure 12, an arm 16 pivotally arranged on a free end of the boom 15, and a bucket 17 attached to a free end of the arm 16. The arm 16 is provided with an angle sensor 16s for detecting the articulation angle of the arm 16.

At a location of good visibility on the excavator 10, for example, on an upper part of the cab 13, an antenna 18 is provided for connection to a wireless communication line. The upperstructure 12 is provided on a rear part thereof with an antenna 19 (only one antenna is shown in FIG. 1 although two antennas are provided) for receiving positioning radio waves from the navigation satellites 50-1, 50-2, 50-3.

On left and right side walls, a rear wall and a front wall of the upperstructure 12, four cameras are provided, respectively, to shoot the peripheral conditions of the excavator 10. In FIG. 1, only a left camera 60L provided on the left side wall and a rear camera 60B provided on the rear wall are shown, but cameras are also provided on the right side wall and the front wall, respectively.

For allowing the operator of the excavator 10 to set a loading point and the direction of the body of the dump truck stopped at the loading point (hereinafter, the loading point and the direction of the body of the dump truck stopped at the loading point will be collectively called "stop posture"), a stop posture setting unit 100 is provided in the interior of the cab 13. The stop posture setting unit 100 is configured including hardware and software. The hardware includes a control unit, which includes arithmetic and control units such as MPU (Micro-Processing Unit) and CPU (Central Processing Unit) and storage units such as ROM (Read Only Memory) and RAM (RandomAccess Memory); as input/output devices, a loading point setting button 101, a direction input device 102 and a foot switch 103; and a display device 110 (see FIG. 2). The software serves to realize the function of the stop posture setting unit 100. The software is executed by the control unit, whereby the function of the stop posture setting unit 100 is realized.

The dump truck 20-1 includes a frame 21 that forms the body of the vehicle, front wheels 22 and rear wheels 23, a vessel 24 tiltable in the up-and-down direction about hinge pins (not shown) provided as a center of pivotal motion on a rear part of the frame 21, and a pair of left and right hoist cylinders (not shown) for allowing the vessel 24 to pivot in the up-and-down direction. In addition, the dump truck 20-1 is provided at a location of good visibility, for example, on a front part of a top wall of the dump truck 20-1 with an antenna 25 for connection to a wireless communication line and two antennas 26 for receiving positioning radio waves from the navigation satellites 50-1, 50-2, 50-3. The remaining dump trucks 20-2, ..., 20-n are of the same configuration as the dump truck 20-1, and therefore their description is omitted.

The control unit 31 is configured including hardware (not shown) and software. The hardware includes an arithmetic and control unit such as CPU, storage units such as ROM and RAM, and an input/output device. The software is executed on the hardware. The hardware executes the software to realize the function of the control unit 31. The control unit 31 is connected to an antenna 32 for connection to a wireless communication line. Further, the control unit 31 communicates with the excavator 10, and also with each of the dump trucks 20-1, 20-2, ..., 20-n.

Figure 2:
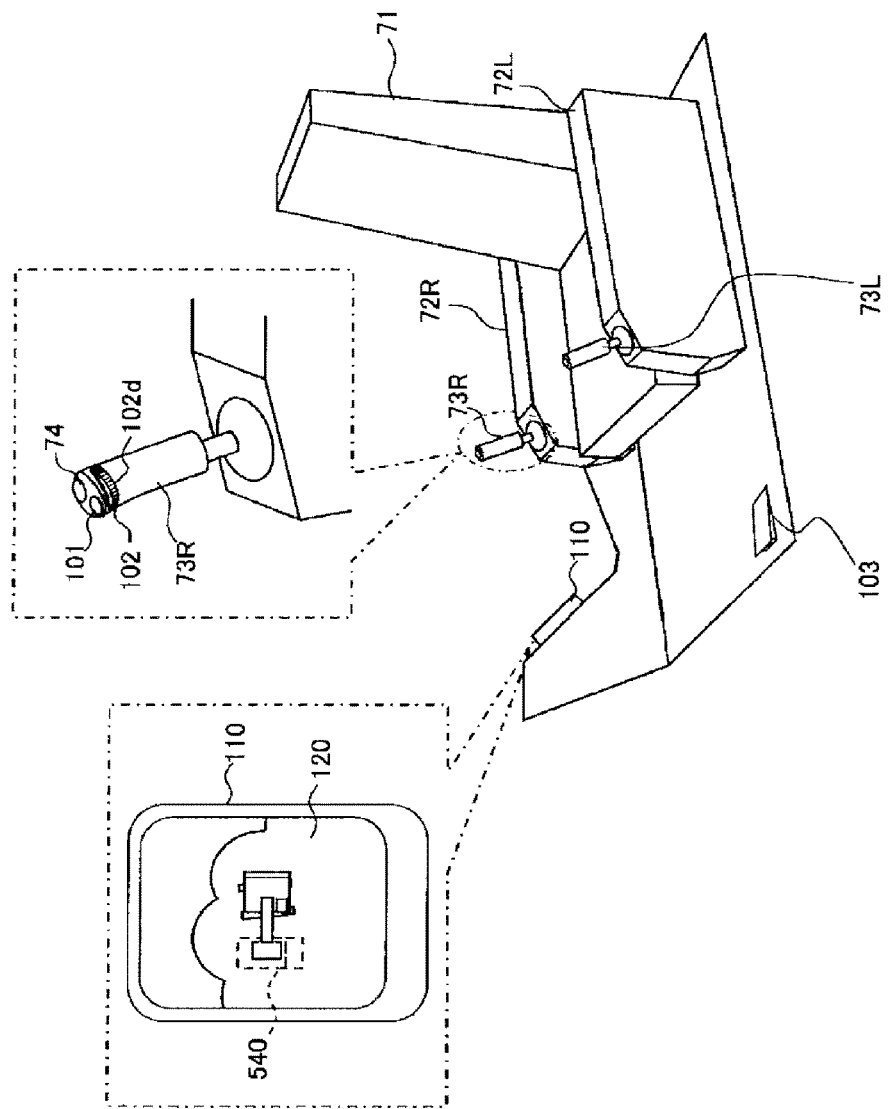
FIG. 2 is a view showing the schematic configuration of the interior of a cab of an excavator 10 shown in FIG. 1.

Based on FIG. 2, a description will next be made of the schematic configuration of the interior of the cab of the excavator 10. FIG. 2 is a view showing the schematic configuration of the interior of the cab of the excavator 10 shown in FIG. 1.

As shown in FIG. 2, a seat 71 in which the operator sits is provided in the cab 13 of the excavator 10. The seat 71 is provided with a left armrest 72L and right armrest 72R. The left armrest 72L and right armrest 72R are provided with a left control lever 73L and right control lever 72R, respectively. The operator holds the left control lever 73L with his or her left hand to control the same, and holds the right control lever 73R with his or her right hand to control the same.

Forward, rearward, leftward and rightward movements of the left control lever 73L and right control lever 73R are reflected to pivotal motions of the respective joints of the arm 16 and turning motions of the upperstructure 12. When the operator moves the left control lever 73L forward or rearward and the right control lever 7R leftward or rightward, the arm 16 pivots and the upperstructure 12 turns so that the bucket 17 moves to a position and into a posture as intended. Accordingly, the operator does not release his or her left and right hands from the left control lever 73L and right control lever 73R during operation of the bucket 17.

In the foregoing, the left and right control levers 73L, 73R are described to be provided in the cab 13 of the excavator 10. As an alternative, it is possible to configure such that they are provided outside the excavator 10 and the operator can perform remote control of the excavator 10 without riding the same. In this case, detection data from the angle sensor 16s, camera images from the left camera 60L and rear camera 60B and from right camera and front camera (illustration of which is omitted) and information on the position of the own vehicle as obtained at the own vehicle position detecting unit are transmitted via wireless communication lines to the stop posture setting unit 100 provided at a remote location.

In this embodiment, the right control lever 73R is provided at an upper end thereof with a horn button 74 for triggering a horn of the excavator 10. In this embodiment, the loading point setting button 101 for setting the position of the bucket 17 is provided next to the horn button 74. On a side wall of the right control lever 73R, the direction input device 102 for setting the direction of the body of the dump truck 20-1 is provided in a vicinity of the loading point setting button 101. The direction input device 102 is configured including a ring member 102d turnable about the direction of the longitudinal axis of the right control lever 73R an axis.

On a wall in right front of the seat 71, there is provided the display device 100 that displays the setting screen 120. This setting screen 120 allows to display the relative positions of the excavator 10 and dump truck 20-1 and to set the direction of the body of the dump truck 20-1. When the operator depresses the loading point setting button 101 after moving the bucket 17 to a desired position by operating the left and right control levers 73L, 73R, the above-described desired position is set as the position of the bucket 17. When the ring member 102d of the input device 102 is turned with the thumb or the like of the hand that holds the right control lever 73R, on the other hand, a controller 150 (see FIG. 4) of the stop posture setting unit 100 reads the angle of the turning movement, and a dump truck image 540 displayed on the setting screen 120 turns correspondingly.

On a floor in front of the seat 71, there is provided a foot switch 103 to determine stop posture for the dump truck.

Figure 3:
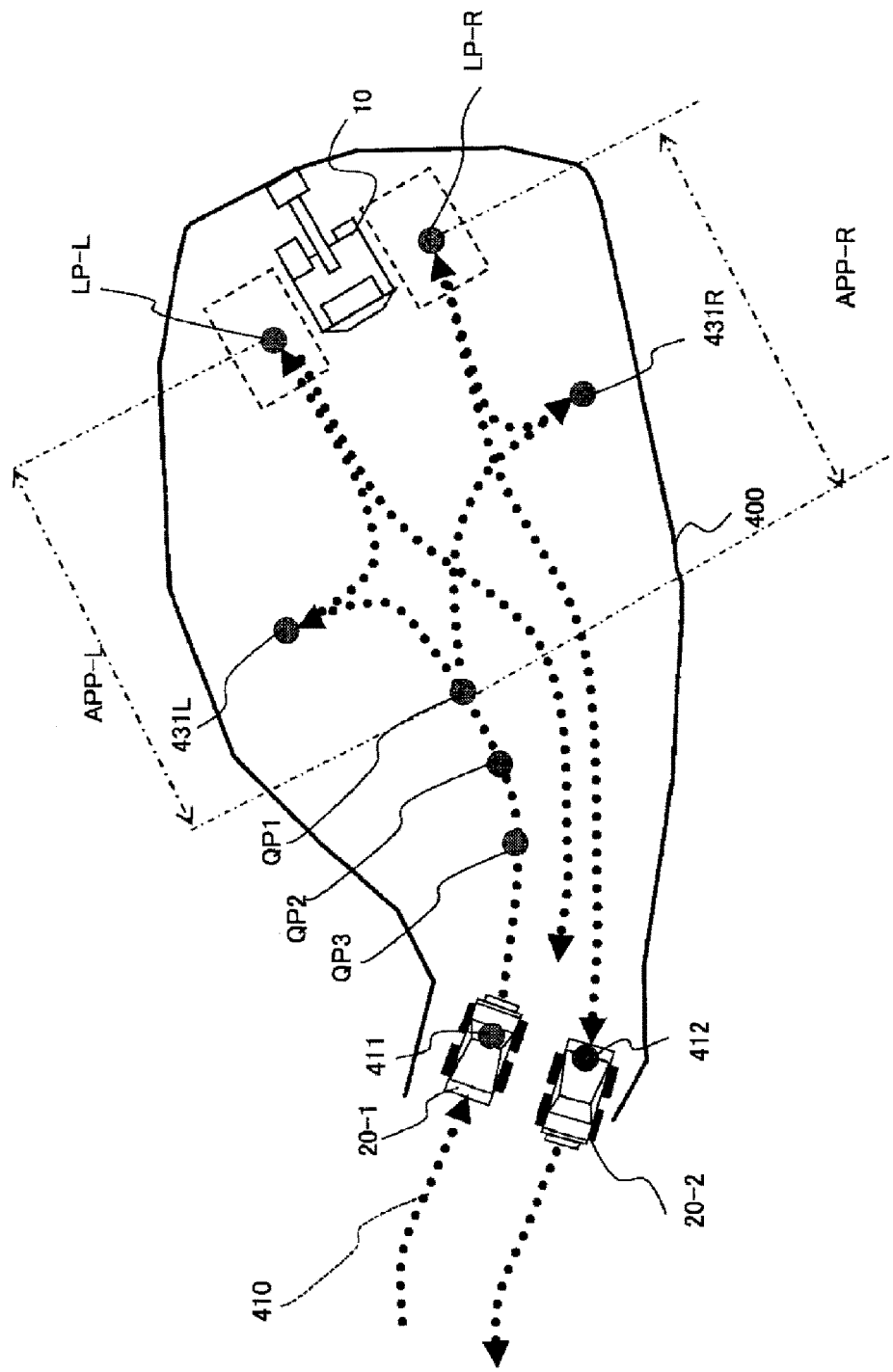
FIG. 3 is a diagram illustrating a travel route for dump trucks in this embodiment.

Based on FIG. 3, a description will next be made about a travel route for dump trucks in a loading area. FIG. 3 is a diagram illustrating the travel route for the dump trucks in this embodiment.

As illustrated in FIG. 3, a travel route 410 has been set beforehand in a loading area 400. Set on the travel route 410 are an entrance 411, an exit 412, a left loading point LP-L and right loading point LP-R (hereinafter described as "LP"s) for the excavator 10, and as queuing positions (hereinafter described as "QP"s) for the dump trucks, three queuing positions QP1, QP2, QP3 on the travel route from the entrance 411 to the LPs. The queuing positions are provided at QP1, QP2, QP3 for three dump trucks in this embodiment, but the number of such queuing positions shall not be limited to this number.

The travel route from QP1, the queuing position closest to LPs among the three queuing positions, to the LPs is set as an approach path (hereinafter described as "APP").

At the QP1, the travel route 410 branches into a left approach path (hereinafter described as "APP-L") directed toward the LP-L and a right approach path (hereinafter described as "APP-R") directed toward the LP-R. On the APP-L and APP-R, switch-back points 431L, 431R are set, respectively, to allow the individual dump trucks 20-1, 20-2, . . . , 20-n to change their advancing directions. In some instances, however, no switch-back operations may be needed.

The dump trucks 20-1, 20-2, . . . , 20-n each enter the loading area 400 from the entrance 411, and advance to and stop at the queuing position closer to the LPs among the unoccupied queuing positions. The dump truck then travels to the queuing position closest to the LPs (hereinafter described as "the closest queuing position"), and stops there to await the next instruction. Although the closest queuing position can be the QP1 or the switch-back point 431L or 431R, it is necessary to choose and determine the closest queuing position beforehand.

When the dump truck stopped at the closest queuing position acquires, from the control unit 31, travel route information corresponding to the stop posture, vehicle control is performed in accordance with the travel route information.

Figure 4:
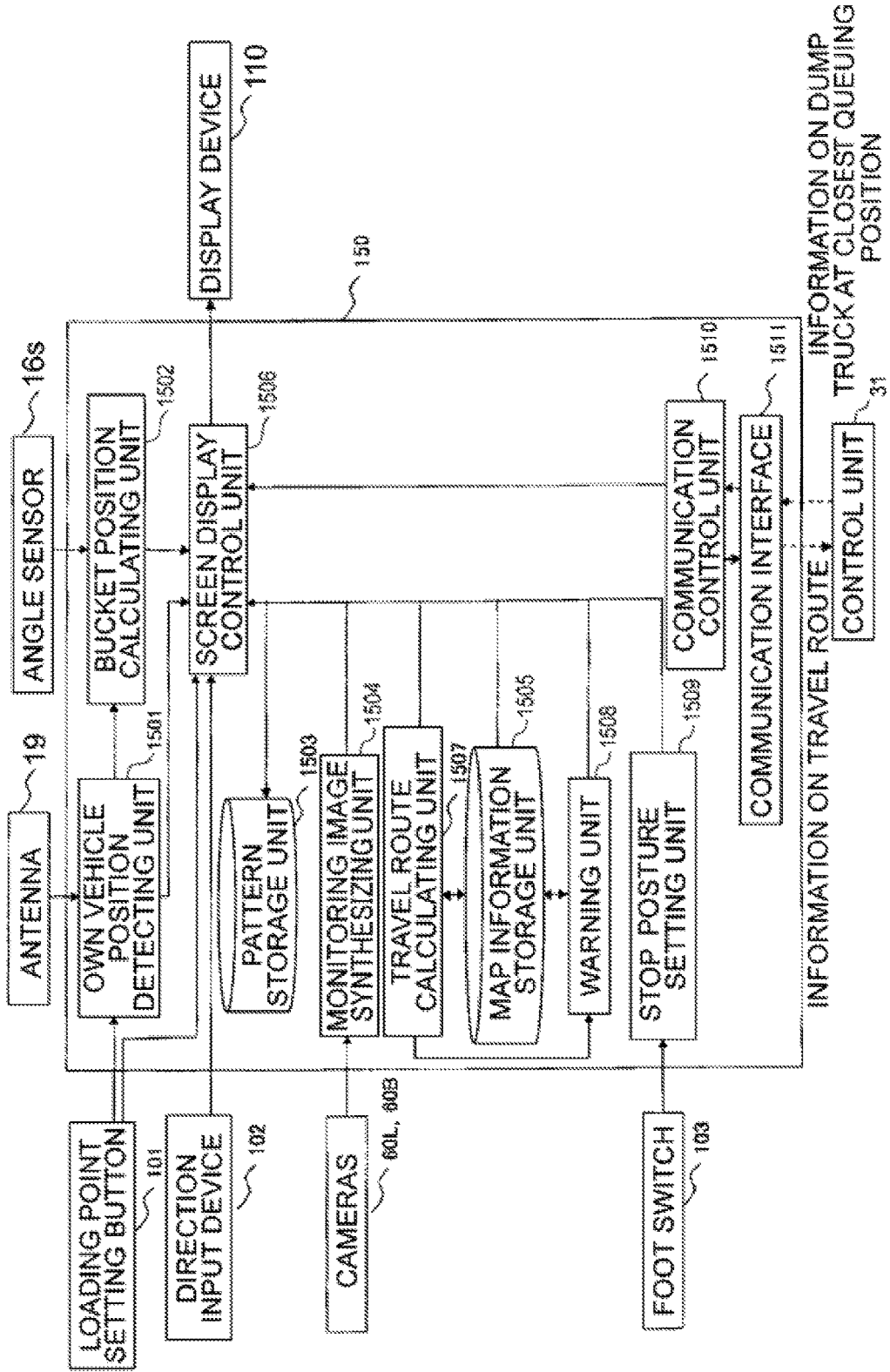
FIG. 4 is a block diagram depicting the internal configuration of the excavator shown in FIG. 1.
Figure 5:
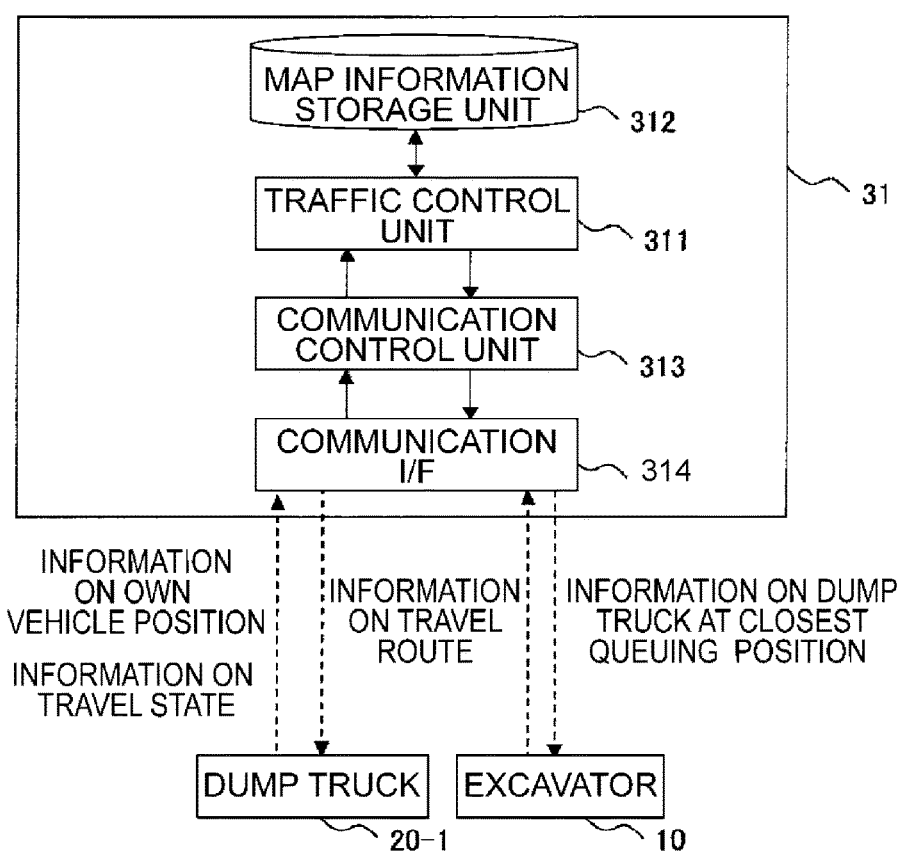
FIG. 5 is a block diagram depicting the internal configuration of a control unit 31 shown in FIG. 1.
Figure 6:
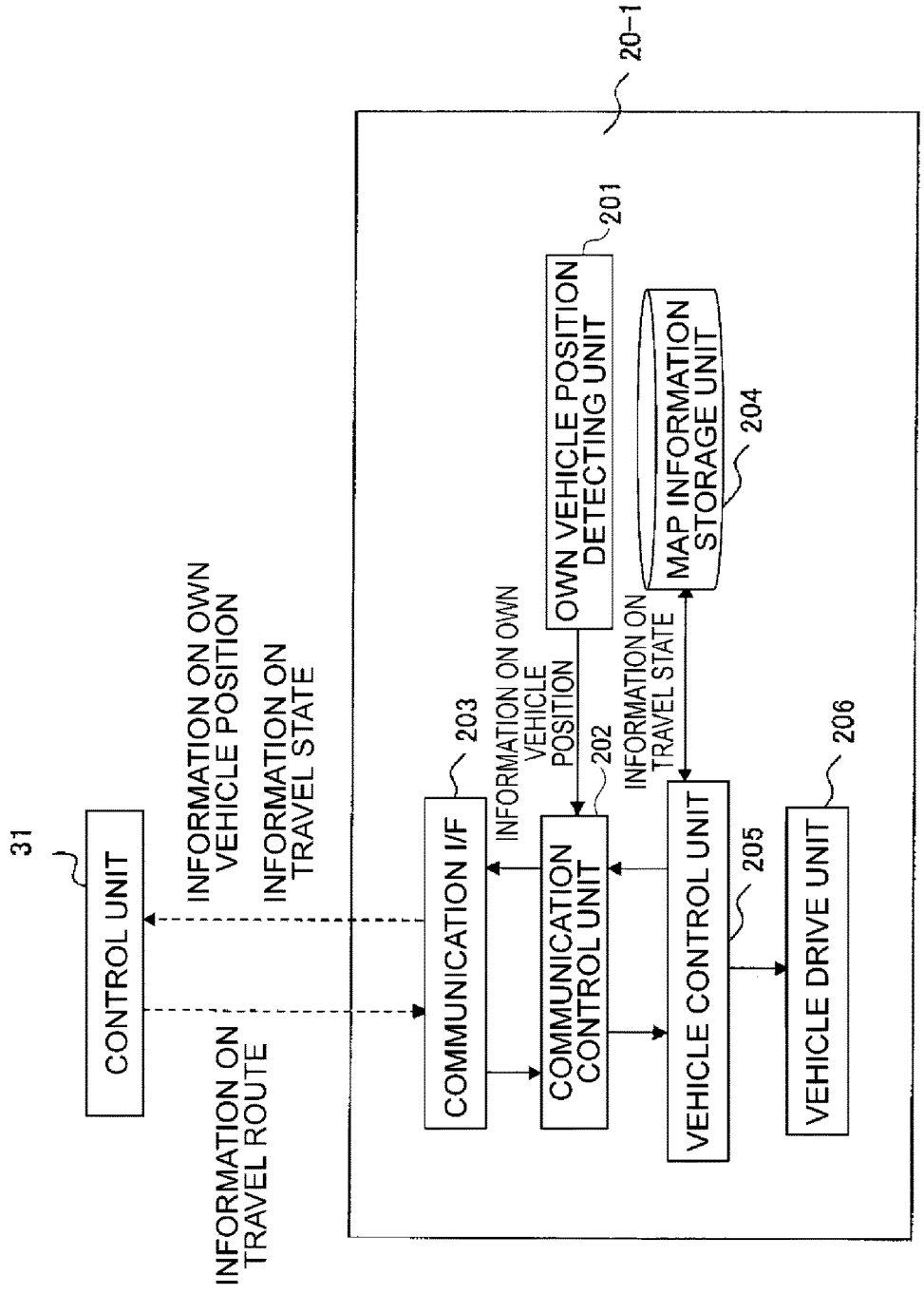
FIG. 6 is a block diagram depicting the internal configuration of a dump truck 20-1 shown in FIG. 1.

Based on FIG. 4 through FIG. 6, a description will next be made about the internal configuration of the vehicle travel system shown in FIG. 1. FIG. 4 is a block diagram depicting the internal configuration of the excavator 10 shown in FIG. 1. FIG. 5 is a block diagram depicting the internal configuration of the control unit 31 shown in FIG. 1. FIG. 6 is a block diagram depicting the internal configuration of the dump truck 20-1 shown in FIG. 1.

As depicted in FIG. 4, the controller 150 of the stop posture setting unit 100 is provided with an own vehicle position detecting unit 1501, a bucket position calculating unit 1502, a pattern storage unit 1503, a monitoring image synthesizing unit 1504, a map information storage unit 1505, a screen display control unit 1506, a travel route calculating unit 1507, a warning unit 1508, a stop posture setting unit 1509, a communication control unit 1510, and a communication interface (hereinafter described as "communication I/F") 1511.

The own vehicle position detecting unit 1501 detects the three-dimensional real coordinates of the own vehicle (the main body of the excavator 10) based on positioning radio waves received from the navigation satellites 50-1, 50-2, 50-3 via the antenna 19. It is to be noted that in the vehicle travel system according to this embodiment, the detect ion of a z-axis coordinate is not essential because various processing such as the setting of a stop posture and the calculation of a travel route can be performed if an x-axis coordinate and y-axis coordinate, which indicate coordinates on a horizontal plane, are available among orthogonal three-dimensional real coordinates defined from the x-direction, y-direction and z-direction.

The bucket position calculating unit 1502 calculates the pivot angle of the arm based on a detection signal from the angle sensor 16s, and based of the pivot angle, the three-dimensional real coordinates of the own vehicle as detected by the own vehicle position detecting unit 1501 and the swing angle of the upperstructure 12, calculates the three-dimensional real coordinates of the bucket 17. These three-dimensional real coordinates of the bucket 17 indicate the loading point.

The pattern storage unit 1503 stores a plurality of loading pattern images that indicate relative positional relations between the excavator 10 and the dump truck 20-1 during the loading work. Details of these loading pattern images will be described subsequently herein with reference to FIG. 7.

The monitoring image synthesizing unit 1504 synthesizes monitoring images by changing points of view of camera images, which can be either video images or still images and have been shot by the individual cameras secured on the left and right side walls and the front and rear walls of the excavator 10, to upper view points, respectively.

Described specifically, in a camera image shot, for example, from obliquely above, an upper part of the image, in other words, a place far from a camera is small, while a lower part of the image, in other words, a place close to the camera is large. The camera images obtained from the respective cameras are, therefore, transformed into such images (bird's eye view images) as if the ground is seen from right above by performing projective transformation such that upper parts of the images are enlarged but lower parts of the images are reduced. A composite monitoring image is then synthesized with a left bird's eye view image, which has been obtained by subjecting to projective transformation the camera image shot by the left camera 60L, being arranged on a left side of an image indicating the excavator 10, and a right bird's eye view image, rear bird's eye view image and front bird's eye view image, which have been obtained by subjecting to projective transformation the camera images shot by the right camera, rear camera 60B and front camera, being arranged on a right side, rear side and front side of the image, respectively.

As a preparation for the projective transformation, a shooting object of known shape is shot by the respective cameras. Transformation values for individual coordinates contained in each camera image are calculated such that the shape of a region, in which the shooting object in the camera image was shot, becomes equal to the shape of the shooting object as seen from the upper view point. These transformation values are stored as calibration data. Upon generation of the monitoring image, the individual coordinates in the respective camera images are subjected to transformation (projective transformation) by using the stored calibration data, whereby the bird's eye view images are synthesized. These bird's eye view images are then combined to synthesize the monitoring image.

The map information storage unit 1505 stores map information, which includes positional information (three-dimensional real coordinates) on the excavator 10 and an obstacle, such as the working face, located around the travel route and terrain information on a travel range of the dump truck 20-1.

When the loading point setting button 101 is depressed, the screen display control unit 1506 selects, from the plurality of loading pattern images stored be forehand in the pattern storage unit 1503, one loading pattern image, which is closest to the actual positional relation between the excavator 10 and the bucket 17, based on the position (three-dimensional real coordinates) of the main body of the excavator 10 as obtained from the own vehicle position detecting unit 1501, the position (three-dimensional real coordinates) of the bucket 17 as obtained from the bucket position calculating unit 1502 and the position (three-dimensional real coordinates) of the surrounding obstacle, such as the working face, contained in the map information stored in the map information storage unit 1505. When the loading point setting button 101 is depressed again, another loading pattern image different from the one selected as described above is selected.

A direction setting image (which will be described subsequently herein with reference to FIG. 9) with an excavator image 510 indicating the main body of the excavator, the bucket image 520, a boundary 530 of the working face and the dump truck image 540 being superimposed in accordance with the above-selected loading pattern image on the monitoring image synthesized by the monitoring image synthesizing unit 1504. The screen with this direction setting image displayed thereon is equivalent to the setting screen 120 (see FIG. 2). It is to be noted that in this embodiment, the excavator image 510, bucket image 520 and dump truck image 540 use icons schematically showing the shapes of an excavator, bucket and dump truck to provide improved visibility. Therefore, the excavator image 510, bucket image 520 and dump truck image 540 will hereinafter be described as the excavator icon 510, bucket icon 520 and dump truck icon 540. Instead of these icons, images of the excavator 10, bucket 17, working face and dump truck 20-1, for example, as seen from the upper view point may be used.

With the setting screen 120 displayed on the display device 110, the operator operates the ring member 102d of the direction input device 102 as needed, so that the dump truck image 540 is turned on the setting screen 120 to finely adjust the direction of the dump truck at the loading point.

The travel route calculating unit 1507 calculates, with reference to the map information stored in the map information storage unit 1505, a travel route on which the dump truck is to be stopped with the stop posture so set, and outputs the travel route to the screen display control unit 1506. The screen display control unit 1506 may display the travel route in superimposition on the direction setting image.

With reference to the positional information on the obstacle included in the map information stored in the map information storage unit 1505, the warning unit 1508 produces a warning if an interference with the obstacle is expected when the haulage vehicle travels along the travel route displayed on the setting screen or if an interference with the obstacle is expected when the haulage vehicle stops at the loading point and along the direction of the haulage vehicle image displayed on the setting screen. It may be configured, for example, to display an icon and/or character information on the setting screen 120 or to produce a warning sound.

The stop posture setting unit 1509 determines, as a stop posture, the loading position of the dump truck and the direction of its body indicated on the setting screen 120 when the operator depressed the foot switch 103.

Via the communication I/F 1511 constructed of wireless communication equipment and further via the control unit 31, the communication control unit 1510 wirelessly transmits travel route information, which indicates a travel route corresponding to the stop posture determined in the foregoing, to the dump truck stopped at the closed queuing position. Further, the communication control unit 1510 receives dump truck information, which includes the own vehicle position of the dump truck stopped at the closest queuing position, from the control unit 31.

As depicted in FIG. 5, the control unit 31 is provided with a traffic control unit 311, a map information storage unit 312, a communication control unit 313, and a communication I/F 314. Based on positional information and travel information acquired from the respective dump trucks 20-1, 20-2, ..., 20-n, the traffic control unit 311 generates control data that indicates the positions and travel states (travelling/stopped) of the respective dump trucks. The map information storage unit 312 stores map information including the position and configuration of a working face in the mine, and map information including the latitudes/longitudes of individual points in the mine. The communication control unit 313 performs control of communications with the excavator 10 and the respective dump trucks 20-1, 20-2, ..., 20-n. The communication I/F 314 is included for connection with wireless communication lines.

By acquiring, from the respective dump trucks 20-1, 20-2, ..., 20-n, own vehicle position information indicating their current positions and travel state information indicating their travel states (travelling/stopped), the traffic control unit 311 generates control data. Described specifically, the traffic control unit 311 generates the control data by superimposing, on the map information, the current positions of the respective dump trucks 20-1, 20-2, ..., 20-n, the preset travel routes for the dump trucks, the queuing positions as set for the dump trucks on the travel routes and the loading point of the excavator 10, and monitors the travel states of the dump trucks. Instead of the above-described configuration, the control unit 31 may calculate the travel states of the respective dump trucks 20-1, 20-2, ..., 20-n based on the quantities of changes per unit time of the own vehicle position information acquired from the respective dump trucks 20-1, 20-2, ..., 20-n. In this case, the transmission and reception of travel state information is not needed.

The map information storage unit 312 stores the same map information as that stored in the map information storage unit 1505 of the excavator 10.

Via the communication I/F 314, the communication control unit 313 receives own vehicle position information and travel state information from each dump truck and outputs them to the traffic control unit 311, and responsive to an inquiry from the excavator 10, transmits the information on the dump truck stopped at the closest queuing position. In addition, the communication control unit 313 also transmits travel route information, which has been received from the excavator 10, to the dump truck stopped at the closest queuing position.

As depicted in FIG. 6, the dump truck 20-1 includes an own vehicle position detecting unit 201, a communication control unit 202, a communication I/F 203, a map information storage unit 204, a vehicle control unit 205, and a vehicle drive unit 206. The own vehicle position detecting unit 201 receives positioning radio waves from the navigation satellites 50-1, 50-2, 50-3 (see FIG. 1) to acquire the current position of the own vehicle. The communication control unit 202 performs control of communications between the excavator 10 and the control unit 31. The map information storage unit 204 stores the map information. The vehicle control unit 205 performs vehicle control to operate the dump truck in accordance with the travel route information. The vehicle drive unit 206 includes a travel system and brake system of the dump truck.

The communication control unit 202 transmits the own vehicle position information, which indicates the current position of the dump truck as calculated by the own vehicle position detecting unit 201, and the travel state information, which the vehicle control unit 205 has generated by detecting the drive state (for example, rpm of a tire) of the vehicle drive unit 206, to the control unit 31 via the communication I/F 203. Further, the communication control unit 202 receives the travel route information from the excavator 10 via the control unit 31.

The map information storage unit 204 stores map information, which includes the position (three-dimensional real coordinates) of an obstacle, such as the working face, located around the excavator 10 and terrain information on a travel range of the dump truck 20-1. This map information is the same map information as those stored in the excavator 10 and control unit 31.

The vehicle control unit 205 performs control of acceleration and deceleration and control of steering angle on the vehicle drive unit 206 such that the dump truck travels in accordance with the travel route information so received.

Here, with reference to the map information stored in the map information storage unit 204, the vehicle control unit 205 collates the current position of the dump truck 20-1 and the positional information of the respective points (nodes), which are indicated in the map information, to calculate a positional deviation, and corrects the advancing direction of the dump truck 20-1.

The information, which the dump trucks 20-1, 20-2, 20-n each receive and transmit, includes identification information that makes it possible to specifically identify the dump truck. Accordingly, the control unit 31 can discriminate, for example, from which one 20-1 of the plural dumps the information was received. It is also possible to discriminate whether or not the information received from the excavator 10 and control unit 31 is for the own vehicle. As such identification information, MAC address (Media Accessible Control address) uniquely allocated to the information I/F 203 may be used, for example. When each piece of information is wirelessly transmitted without specifying its intended recipient, each of the dump trucks 20-1, 20-2, ..., 20-n, upon receipt of the wireless transmission, can determine whether or not it is the information that the own vehicle should receive. Then, each dump truck receives the wireless transmission if it is the information transmitted to the own vehicle, but discards the wireless transmission if it is the information transmitted to another vehicle. Similarly, each piece of information which the excavator 10 and control unit 31 receives or transmits contains identification information that makes it possible to specifically identify its intended recipient.

Figure 7:
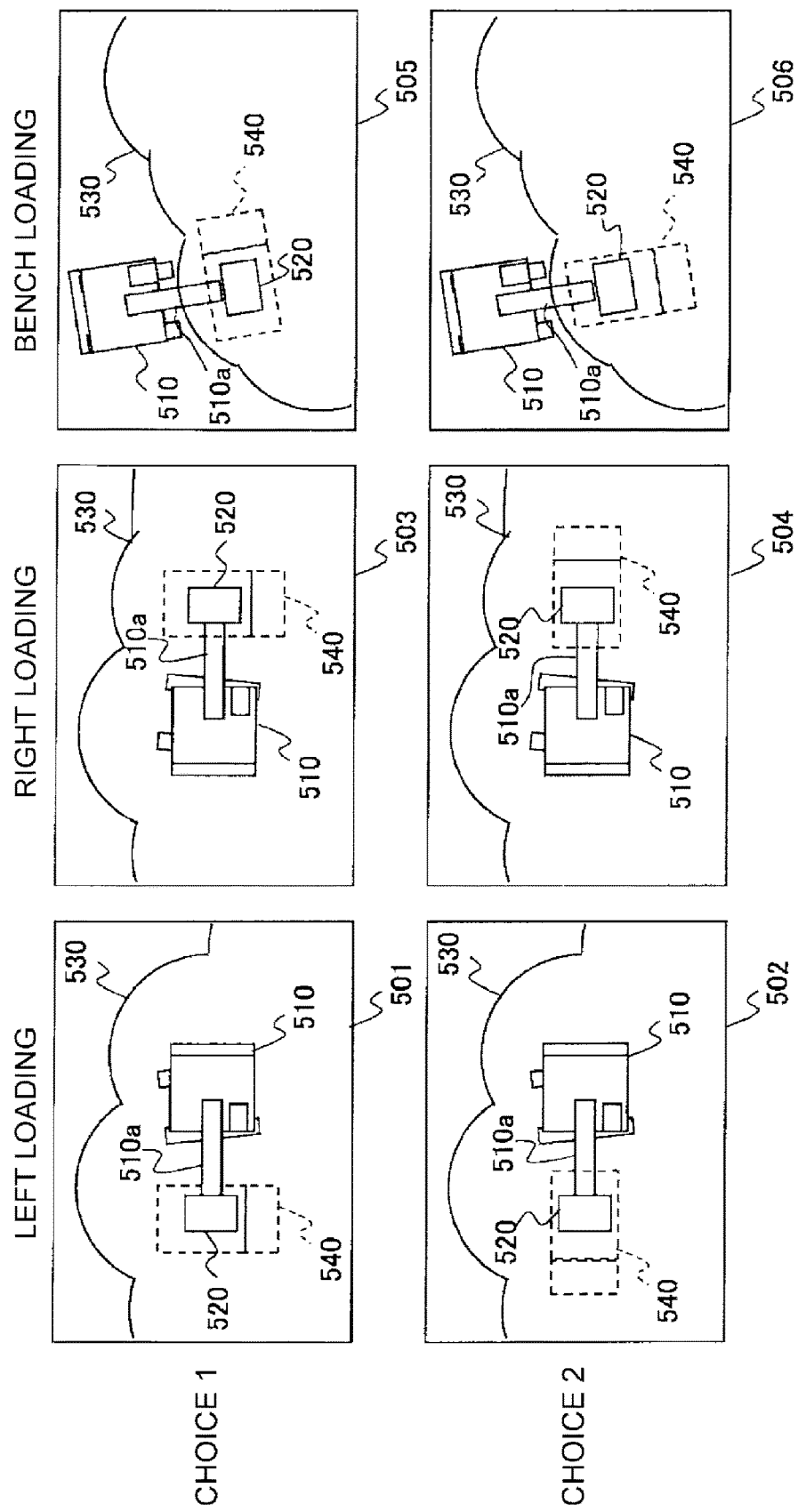
FIG. 7 is an illustration diagram of examples of loading pattern images stored in a pattern storage unit 1503 in FIG. 4.

Referring next to FIG. 7, a description will be made about loading pattern images to be stored in the pattern storage unit. FIG. 7 is an illustration diagram of examples of loading pattern images stored in the pattern storage unit 1503 in FIG. 4.

In this embodiment, six loading pattern images 501 to 506 illustrated in FIG. 7 are stored in the pattern storage unit 1503. The loading pattern images 501 to 506 each include the excavator icon 510 indicating an excavator main body, the bucket icon 520 indicating the position of a bucket, the boundary 530 indicating a working face, and a dump truck icon 540 indicating the position of a dump truck.

The six loading pattern images 501 to 506 are grouped into three kinds, that is, left loading, right loading and bench loading based on the relative positions of the excavator icon 510 and dump truck icon 540. Further, in each kind, there are two patterns, that is, Choice 1 and Choice 2 depending on the direction of the dump truck icon 540 relative to the excavator ion 510.

The loading pattern image 501 is a pattern of left loading that the position of the bucket icon 520 is shown opposite to the boundary 530 of the working face and on the left side of the excavator icon 510, and illustrates a loading pattern image that the direction of the longitudinal axis of an arm 510a of the excavator icon 510 and the front-and-rear direction of the dump truck icon 540 are in a perpendicular relation (Choice 1).

The loading pattern image 502 is another pattern of left loading, and illustrates a loading pattern image that the direction of the longitudinal axis of the arm 510a of the excavator and the front-and-rear direction of the dump truck icon 540 are in a parallel relation (Choice 2).

The loading pattern image 503 is a pattern of right loading that the position of the bucket icon 520 is shown opposite to the boundary 530 of the working face and on the right side of the excavator icon 510, and illustrates a loading pattern image that the direction of the longitudinal axis of the arm 510a of the excavator icon 510 and the front-and-rear direction of the dump truck icon 540 are in a perpendicular relation (Choice 1). On the other hand, the loading pattern image 504 is another pattern of right loading, and illustrates a loading pattern image that the direction of the longitudinal axis of the arm 510a of the excavator icon 510 and the front-and-rear direction of the dump truck icon 540 are in a parallel relation (Choice 2).

The loading pattern image 505 is a pattern of bench loading that the excavator icon 510 is on the outer side of the boundary 530 of the working face and the bucket icon 520 is on the inner side of the boundary 530 (the method that a loading machine sits on a bench above a working face and performs loading into a haulage vehicle below the bench), and illustrates a loading pattern image that the direction of the longitudinal axis of the arm 510a of the excavator icon 510 and the front-and-rear direction of the dump truck icon 540 are in a perpendicular relation (Choice 1). On the other hand, the loading pattern image 506 is another pattern of bench loading, and illustrates a loading pattern image that the direction of the longitudinal axis of the arm 510a of the excavator icon 510 and the front-and-rear direction of the dump truck icon 540 are in a parallel relation (Choice 2).

If the dump truck icon and the boundary of the working face interfere with each other in one or more of the loading pattern images stored beforehand, the image display control unit 1506 may display the dump truck icon in a form that its direction has been finely adjusted to avoid interference.

Figure 8:
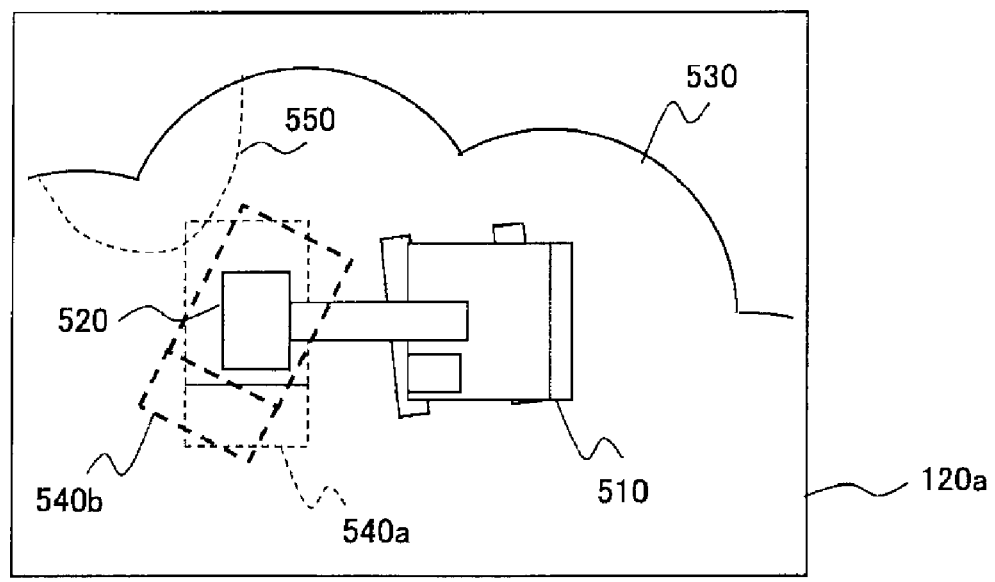
FIG. 8 is an illustration diagram of an example of display on a setting screen 120 shown in FIG. 2.
Figure 10:
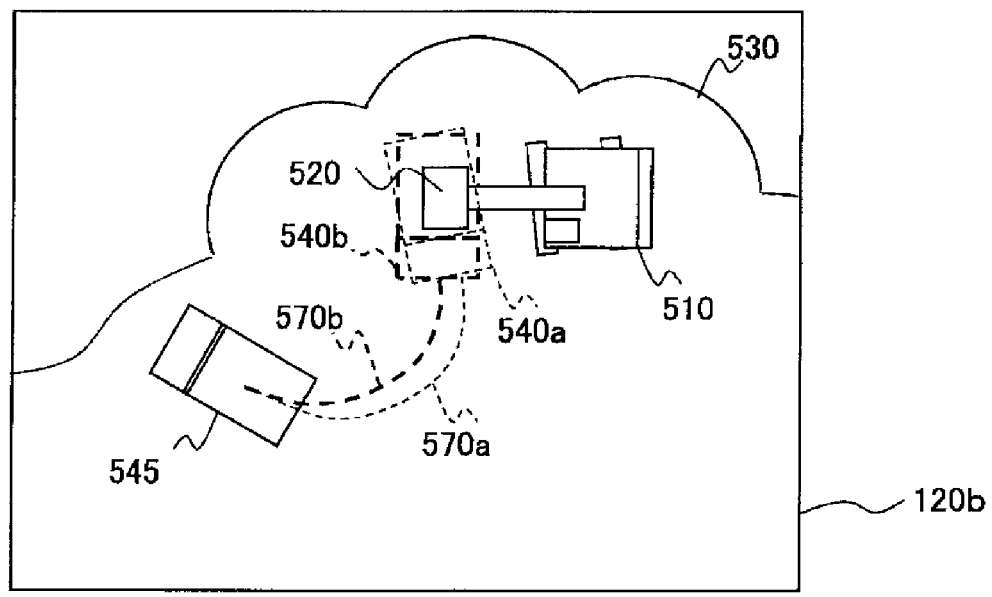
FIG. 10 is an illustration diagram of a setting screen with travel routes displayed in superimposition.
Figure 11:
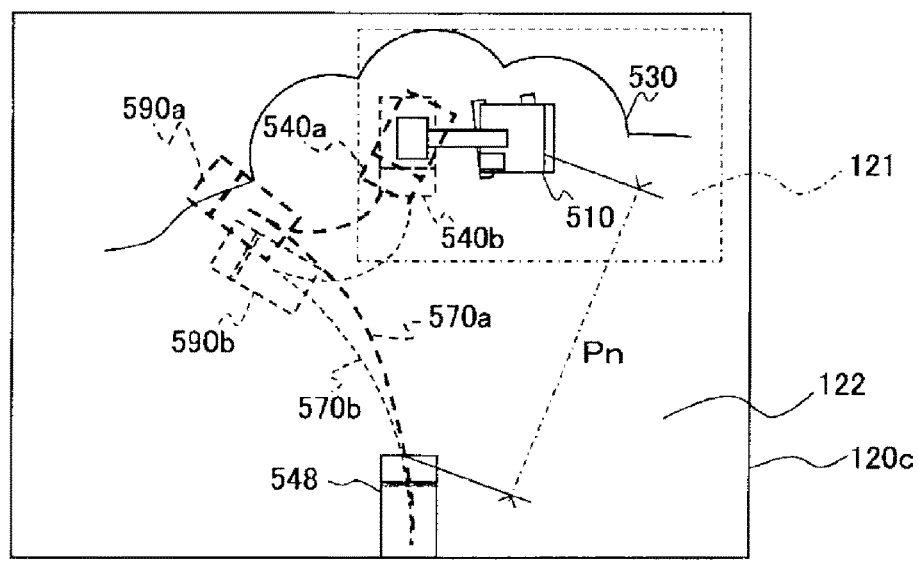
FIG. 11 is an illustration diagram of a setting screen with a monitoring screen and a wide area image combined together.

Based on FIG. 8 through FIG. 12, a description will next be made about examples of displays on setting screens in this embodiment. FIG. 8 is an illustration diagram of an example of display on the setting screen 120 shown in FIG. 2. FIG. 9 is an illustration diagram of a state that in the setting screen 120a of FIG. 8, display of an interference warning has been performed. FIG. 10 is an illustration diagram of a setting screen with travel routes displayed in superimposition. FIG. 11 is an illustration diagram of a setting screen with a monitoring screen and a wide area image combined.

The setting screen 120a illustrated in FIG. 8 shows a state that a direction setting image is displayed. In the direction setting image, the excavator icon 510, the bucket icon 520, the boundary 530 of the working face, and the dump truck icon 540a or 540b are displayed in superimposition on a monitoring screen. As shown in the setting image 120a, when rock crumbled down from the working face scatters, for example, at such a position as indicated at numeral 550 in FIG. 8, there is a potential problem of interference with the scattering rock if the dump truck 20-1 advances in the direction indicated by the dump truck icon 540a. The operator, therefore, operates the direction input device 102 to turn the dump truck icon from the direction indicated by the dump truck icon 540a to the direction indicated by the dump truck icon 540b about a point (two-dimensional loading point) corresponding to the loading point in the direction setting image (setting screen). Here, the directions of the dump truck icons 540a, 540b are configured to be turned and displayed in accordance with the turning operation angle of the direction input device 102, so that the operator can operate the direction input device 102 with such a feeling as if he or she would be turning the actually-advancing dump truck 20-1 with the ring member 102d. Accordingly, the operator can finely adjust the direction of the haulage vehicle in an intuitive and comprehensible manner.

Figure 9:
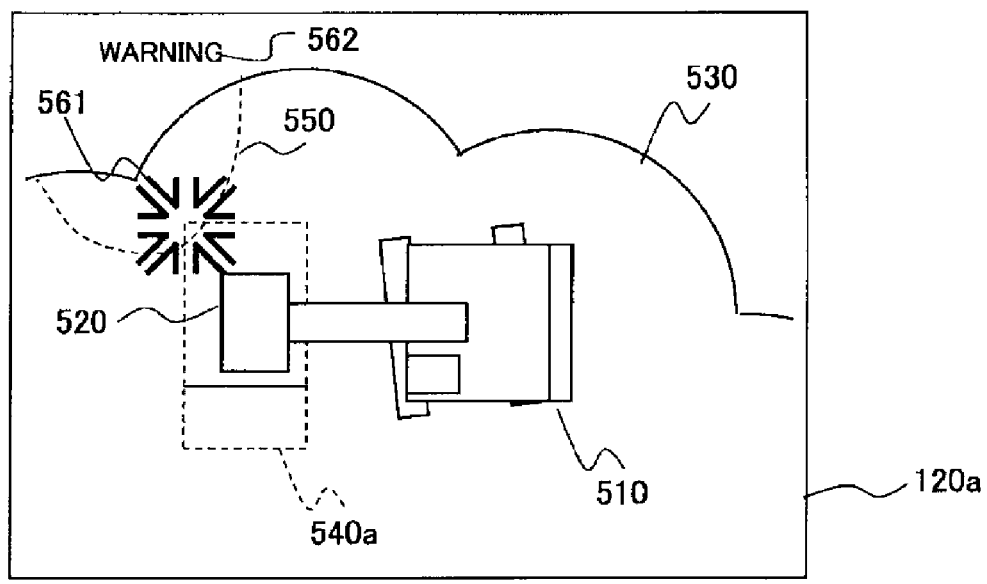
FIG. 9 is an illustration diagram of a state that in a setting screen 120a of FIG. 8, display of an interference warning has been performed on a setting screen in FIG. 8.

If the dump ions 540a, 540b and the surrounding obstacle, such as the working face, stored in the map information storage unit 1505 interfere with each other in such a fine adjustment operation, the warning unit 1508 may display an interference warning sign 561 and character information 562 in superimposition on the setting screen 120a as illustrated in FIG. 9 to notify the operator of the occurrence of an interference. Accordingly, the operator is prevented from carelessly setting an improper direction.

Further, as shown in a setting screen 120b illustrated in FIG. 10, expected travel routes 570a, 570b for the dump truck 20-1 may be displayed in superimposition. The travel route 570a is a travel route that corresponds to the direction of the dump truck icon 540a. When the dump truck icon 540a turns and changes into the direction of the dump truck icon 540b, the travel route 570a is renewed to the travel route 570b, followed by display of the latter.

In the setting screen 120b, the display of a dump truck icon 545, which indicates the position of the dump truck at the closest queuing position, allows the operator to grasp the travel route in its entirety. Accordingly, the operator can set an appropriate loading point and direction while also taking the travel route of the dump truck into consideration.

As in a setting screen 120c illustrated in FIG. 11, a dump truck icon 548 indicating a dump truck stopped at the closest queuing position (QP1) and the dump truck icon 540a or 540b indicating the dump truck stopped at the preset loading point may be displayed on a single screen. In this case, a peripheral region of the excavator 10 has been shot in a monitoring screen 121, and the area as far as the close queuing position (QP1) may not be included in any of the shooting ranges of the four cameras. Therefore, the screen display control unit 1506 generates a wide area image (graphical image) 122 including the excavator, working face and closest queuing position (QP1), and generates a composite image with the monitoring image 121 superimposed on a partial region, which corresponds to the shooting range of the monitoring image 121, in the wide area image 122. Then, the screen display control unit 1506 superimposes the travel route on the composite image to synthesize a setting image, and displays the setting image on the display device 110.

At this time, the screen display control unit 1506 brings the reduction ratio of the monitoring image 121 and that of the wide area image 122 into coincidence with each other. For example, based on the three-dimensional real coordinates of the excavator 10 and those of the dump truck 20-1 stopped at the closest queuing position, the actual distance D between the excavator 10 and the dump truck 20 on a three-dimensional coordinate system is calculated. Then, the number (Pn) of pixels used upon displaying the distance D [m] on the setting screen 120c is determined, and by the following formula (1), the actual distance per pixel is determined.

$$d = D/Pn \tag{1}$$

where d: [m/pixel]

By expanding or reducing the monitoring image 121 and wide area image 122 to satisfy the formula (1), the reduction ratios of both the images come to coincidence. This facilitates to grasp the distance, travel route, and body direction from the closest queuing position (QP1) to the loading point when the operator sees the setting screen 120c. By also taking into consideration the travel route from the closest queuing position (QP1) to the loading point, the direction of the body of the dump truck at the loading point can then be set.

According to the setting screen 120c of FIG. 11, the travel routes 570a, 570b outside the shooting range of the monitoring image 121 can be also displayed. It is, therefore, appreciated that on the travel route 570b, the dump truck icon 590b interferes with the boundary 530 of the working face at the switch-back point. Therefore, the dump truck icon 540a at the loading point is turned into the dump truck icon 540b to change the travel route 570a into the route indicated as the travel route 570a. Even at the switch-back point, a dump truck icon 590a hence no longer interferes with the boundary 530 of the working face.

Figure 12:
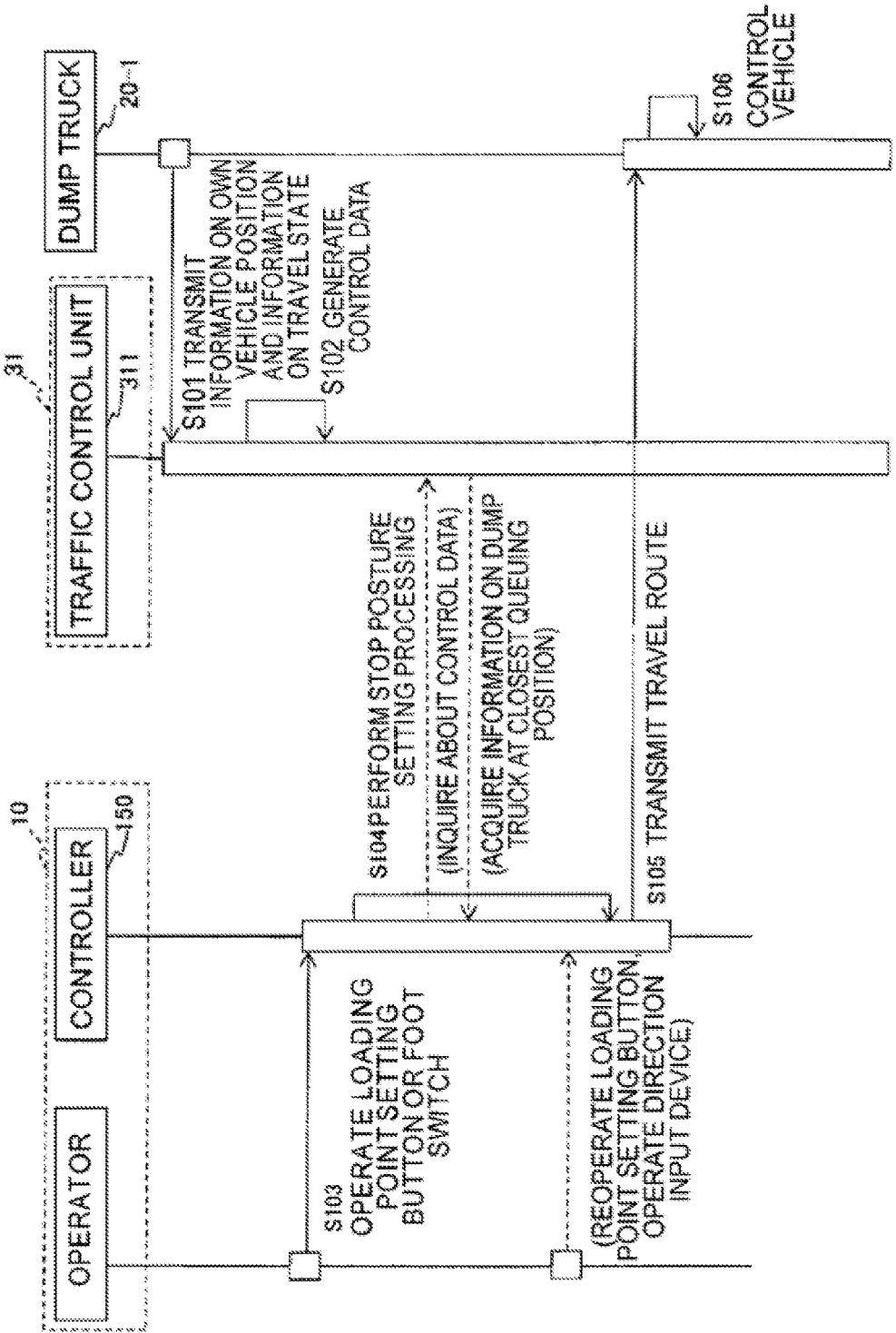
FIG. 12 is a sequence diagram illustrating the flow of processing in the vehicle travel system 1 according to this embodiment.

Referring next to FIG. 12, a description will be made of the flow of processing by the vehicle drive system according to this embodiment. FIG. 12 is a sequence diagram illustrating the flow of the processing by the vehicle travel system 1 according to this embodiment.

As illustrated in FIG. 12, during operation of the dump truck 20-1, the own vehicle position detecting unit 201 of the dump truck 20-1 calculates the current position to generate own vehicle position information, and the vehicle control unit 205 calculates travel state information. These own vehicle position information and travel state information are transmitted to the control unit 31 (S101). Based on the own vehicle position information and travel state information, the traffic control unit 311 generates control data including the position and travel state of each dump truck (S102). In FIGS. 12, S101 and S102 each indicate a single series of processing for the sake of convenience of the description. If one or more dump trucks are, however, in operation, the traffic control unit 311 repeatedly performs the generation of control data.

In this state, the operator of the excavator 10 operates the left and right control levers 73L, 73R to move the bucket 17 of the excavator 10 to the loading point. In the resulting state, the operator of the excavator 10 operates the loading point setting button 101, or the operator of the excavator 10 depresses the foot switch 103 (S103). Using the operation of the loading point setting button 101 or the depression of the foot switch 103 as a trigger, the stop posture setting processing at the controller 150, specifically the processing for setting the stop posture and direction of the dump truck 20-1 is started (S104).

During the execution of the stop posture setting processing, an inquiry for control data is made from the controller 150 to the traffic control unit 311 to acquire information on the dump truck stopped at the closest queuing position. The operator may perform re-operation of the loading point setting button 101 and operation of the direction input device 102, but their details will be described subsequently herein.

Travel route information, which corresponds to the stop posture determined by the stop posture setting processing, is transmitted to the dump truck 20-1 via the control unit 31 (S105).

Vehicle control is performed to allow the dump truck 20-1 to travel along and stop on the travel route, so that the dump truck 20-1 begins to move toward the loading point (S106).

Figure 13:
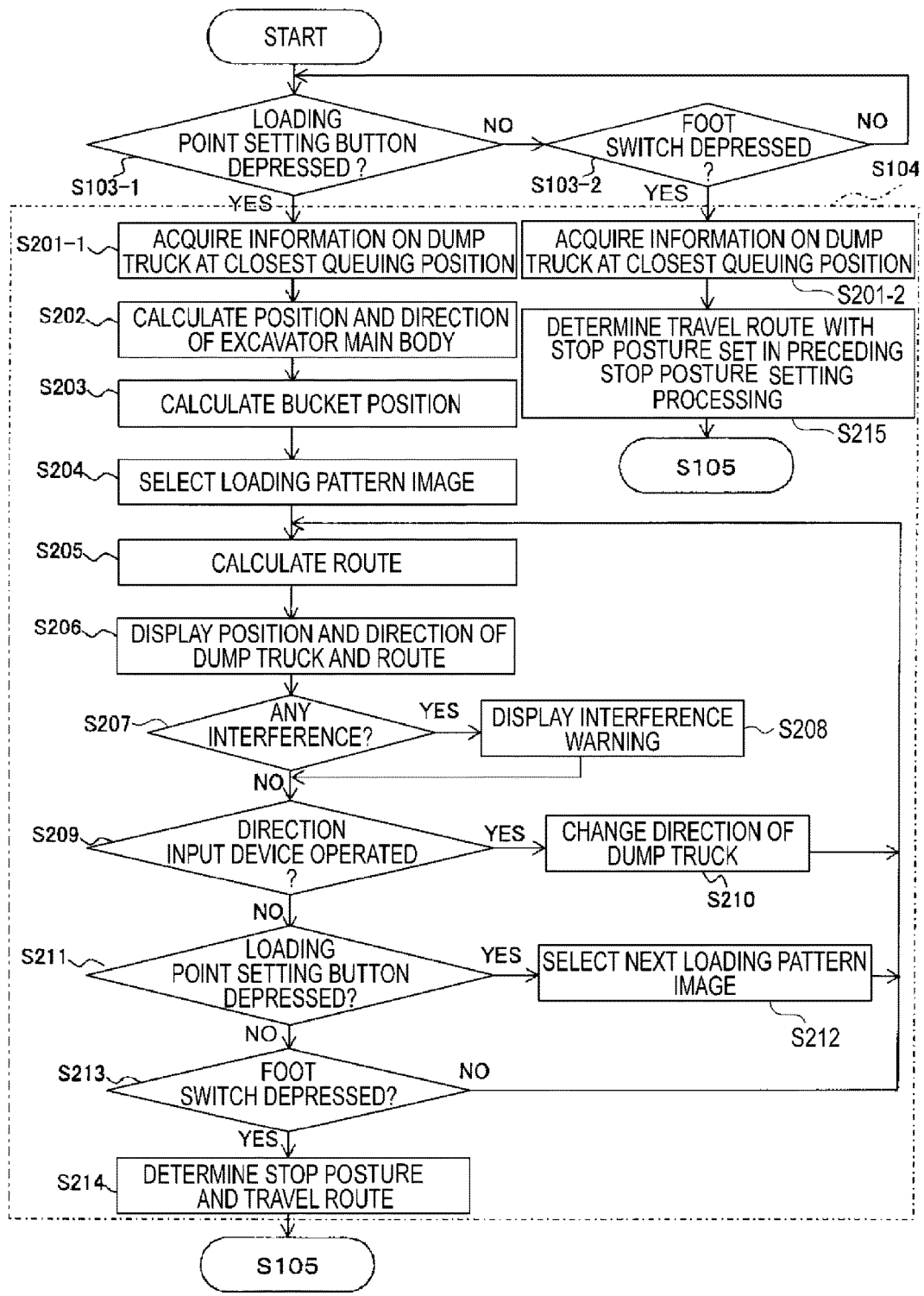
FIG. 13 is a flowchart illustrating the flow of stop posture setting processing.

Based on FIG. 13, a description will next be made about the stop posture setting processing. FIG. 13 is a flowchart illustrating the flow of the stop posture setting processing.

If there is an operation of the loading point setting button 101 in the state that an operation of the loading point setting button 101 by the operator is being waited for (S103-1/YES), an inquiry is made from the image display control unit 1506 to the traffic control unit 311 to acquire the own vehicle position information (dump truck information) on the dump truck stopped at the closest queuing position (S201-1).

Then, the position and direction of the main body of the excavator 10 (the swing angle of the upperstructure 12) is calculated by the own vehicle position detecting unit 1501 (S202). Further, the bucket position calculating unit 1502 calculates the bucket position (three-dimensional real coordinates) based on the position and direction of the main body of the excavator 10 and the angle of the arm as calculated from the angle sensor 16s (S203).

Based on the position and direction of the main body of the excavator 10, the bucket position, and the position of the peripheral obstacle, such as the working face, contained in the map information stored in the map information storage unit 1505, the image display control unit 1506 selects the loading pattern image closest to the current situation from the plural loading pattern images stored beforehand in the pattern storage unit 1503 (S204). Described specifically, one of the left loading, right loading and bench loading is selected from the position of the main body of the excavator 10, the position of the bucket 17 and the position of the surrounding obstacle, and from the relevant patterns, Choice 1 in which the direction of the dump truck is perpendicular to the arm is selected first. The selection of a loading pattern may be configured such that the loading pattern of Choice 1 is selected first, the loading pattern of Choice 2 is selected if the loading point setting button 101 is depressed again in this state, and further, the loading pattern of Choice 1 is selected if the loading point setting button 101 is depressed again.

The travel route calculating unit 1507 calculates the expected travel route and switch-back point of the dump truck 20-1 based on the current position and direction of the dump truck and the selected loading point and direction (S205).

The monitoring image synthesizing unit 1504 synthesizes a monitoring image based on four camera images. The image display control unit 1506 superimposes the excavator icon 510, the bucket image 520, the boundary 530 of the working face, and the dump truck icon 540 on the monitoring image, and displays the resulting setting image on the display device 110 (S206). In addition, the travel routes 570a, 570b, the dump icon 548 at the closest queuing position, and the dump icons 590a and 590b at the switch-back point may also be superimposed.

With reference to the map information in the map information storage unit 1505, the warning unit 1508 determines whether or not the dump icons at the switch-back point or on the travel route would interfere with the surrounding obstacle such as the working face. If any interference is expected (S207/YES), a warning of interference is displayed using the icon 561 and character information 562 (see FIG. 9), which indicate a warning, or the like (S208).

If there is an operation of the direction input device 102 by the operator (S209/YES) when no interference is expected (S207/NO) or after the display of the interference warning (S208), the direction of the dump icon 540 on the setting screen is changed in accordance with the amount of the operation of the direction input device 102 (S210), and the flow then returns to step S205 to calculate the travel route again.

If there is no operation of the direction input device 102 (S209/NO) and if there is an operation of the loading point setting button 101 by the operator (S211/YES), the image display control unit 1506 selects a next choice in place of the currently-selected loading pattern image (S212). The flow then returns to step S205 to calculate the travel route again. If the preceding selected choice is the last choice among the loading pattern images, the first choice is selected.

If there is no operation of the loading point setting button 101 by the operator (S211/NO) and if there is an operation of the foot switch 103 by the operator (S213/YES), the loading point for the dump truck and the direction of its body, which are displayed on the display device 110, are determined to be a stop posture, and travel route information, which indicates a travel route corresponding the stop posture, is generated (S214). Subsequently, in step S105, the travel route information is wirelessly transmitted to the dump truck 20-1 via the control unit 31 (S105). If there is no operation of the foot switch 103 by the operator (S213/NO), the flow returns to step S205 to calculate the travel route again.

If there is an operation of the foot switch 103 in the state that an operation of the loading point setting button 101 by the operator is being waited for (S103-1/NO, S103-2/YES), information on the dump truck at the closed queuing position is acquired (S201-2). Then, the stop posture set in the preceding stop posture setting processing (and temporarily stored in RAM or the like of the controller 150) are read, the stop posture is determined to be the current stop posture, and corresponding to the current stop posture, a travel route is calculated to generate travel route information (S215). Subsequently, the travel route information is wirelessly transmitted to the dump truck 20-1 via the control unit 31 (S105). If there is neither an operation of the loading point setting button 101 nor an operation of the foot switch 103 (S103-1/NO, S103-2/NO), the flow returns to step S103-1 again, and remains in a waiting state for input operations of the loading point setting button and foot switch.

According to this embodiment, the operator can set the loading position and direction for each dump truck after confirming the peripheral conditions of the excavator, so that the dump truck is allowed to travel toward the loading point and to stop while avoiding interference with any obstacle which is not reflected to the map information. Especially when a monitoring image is displayed in superimposition, the direction of each dump truck can be set by taking into consideration the positional relation with an obstacle such as rock scattered at a place which is a blind spot from the operator. When the travel route is displayed in superimposition, the direction of each dump truck can be set by taking into consideration possible interference on the travel route.

Owing to the arrangement of the bucket position setting button, loading point setting button and direction input device on the control lever, the operator of the excavator can perform the setting and operation of the loading point and the direction of each dump truck without releasing his or her hand from the control levers.

The operation device for the determination of the loading point and the direction of each dump truck is separately configured using the foot switch. As a false operation under the influence of vibrations occurs less likely upon operation of the foot switch than when a button or switch is operated by the hand, it is possible to avoid such an inconvenience that an operation may be performed to result in the determination of an unintended loading point or dump truck direction.

Further, in the event that any dump truck is expected to interfere with the obstacle, the warning unit produces a warning, thereby enabling to urge the operator to input the direction of the body again such that the possible interference with the obstacle can be eliminated.

The above-described embodiment is merely illustrative for the description of the present invention, and is not intended to limit the scope of the present invention to the embodiment only. Those skilled in the art can practice the present invention in various other modes without departing from the gist of the present invention. For example, instead of the foot switch, an operation button for performing the determination of the loading point and dump truck direction may be provided adjacent the loading point setting button, or the loading point setting button may be provided on one of the left and right control levers and the operation button for performing the determination of the loading point and dump truck direction may be provided on the other operation lever. The loading point setting button and direction input device may not necessarily be on the same lever. However, the adoption of the configuration described in the foregoing embodiment can provide a user interface which is easier for the operator to use, because the side-by-side arrangement of similar buttons on the left or right lever can be avoided, the loading point setting button and direction input device can be put into one position, and memorization is possible in an associated manner that the final select or determination is made by the foot.

In the above-described embodiment, the warning unit is not essential. The embodiment may be configured such that the operator determines by himself or herself the existence or non-existence of interference between the travel route or dump truck icon and the obstacle.

In the foregoing, the description is made by mentioning unmanned haulage vehicles as an example. However, the present invention may also be applied to manned haulage vehicles. Such an application makes it possible to avoid interference with an obstacle if the obstacle is located at a place which is a blind spot from the operator of the haulage vehicle. When the present invention is applied to manned haulage vehicles, each manned haulage vehicle is provided, in place of the vehicle control unit, with a display device that displays a travel route, and the operator operates the haulage vehicle such that it is allowed to travel along and stop on the travel route. Accordingly, the possible interference with an obstacle can also be avoided for manned haulage vehicles.

LEGENDS

1: Vehicle travel system
10: Excavator
20-1, 20-2, 20-$n$: Dump trucks
31: Control unit
100: Stop posture setting unit
101: Loading point setting button
102: Direction input device
110: Display device

The invention claimed is:

1. A vehicle travel system for guiding a haulage vehicle, which hauls a payload by unmanned operation from a loading machine that performs loading work on the payload, to a loading point for the payload, the loading machine including a front working device which is provided with a boom, an arm attached to a free end of the boom, and a bucket attached to a free end of the arm, the vehicle travel system comprising:
 a stop posture setting unit which includes a controller and input and output devices respectively connected to the controller,
 wherein:
 the input devices include a button and a ring member, and the output device includes a display device,
 the controller is configured to control the display device to display a setting screen including a haulage vehicle image which indicates a direction of a body of the haulage vehicle at the loading point, the controller is further configured to receive a position of the bucket that indicates the loading point to the haulage vehicle which is input via the button, the controller is further configured to receive the direction of the body of the haulage vehicle at the loading point and receive an angle of turning movement to change a direction of the haulage vehicle image which are each input via the ring member, the controller is further configured to:

turn and move the haulage vehicle image in the displayed setting screen in accordance with the angle of turning movement about a two-dimensional loading point that indicates the loading point, calculate a travel route to stop the haulage vehicle in the inputted direction at the loading point, display the travel route in superimposition on the setting screen, and perform vehicle control to allow the haulage vehicle to travel along and stop on the travel route.

2. The vehicle travel system according to claim 1, wherein the controller is further programmed to:

with reference to positional information on an obstacle located around the loading point or the travel route, produce a warning when an interference with the obstacle is expected as the haulage vehicle travels along the travel route displayed in superimposition on the setting screen or when an interference with the obstacle is expected when the haulage vehicle stops at the loading point and along the direction of the haulage vehicle image displayed in superimposition on the setting screen.

3. The vehicle travel system according to claim 1, further comprising:

a camera mounted on the haulage vehicle and connected to the controller, and wherein the controller is further programmed to:

change a view point of a camera image, obtained by shooting a periphery of the loading machine with the camera, to an upper view point to synthesize a monitoring image, generate a wide area image including a queuing position for the haulage vehicle and the loading point, generate a composite image with the monitoring image superimposed on a partial area, which corresponds to a shooting range of the monitoring image, in the wide area image, and display the travel route in superimposition on the composite image on the display device.

4. The vehicle travel system according to claim 1, wherein the loading machine includes:

control levers for operating the front working device, and wherein the ring member is provided on one of the control levers and is turnable about a direction of an axis of the one of the control levers.

* * * * *